United States Patent [19]

Yokoyama

[11] Patent Number: 5,067,747
[45] Date of Patent: Nov. 26, 1991

[54] INSTRUMENT PANEL STRUCTURE OF CAR BODY

[75] Inventor: Hideki Yokoyama, Higashihiroshima, Japan

[73] Assignee: Mazda Motor Corporation, Hiroshima, Japan

[21] Appl. No.: 546,319

[22] Filed: Jul. 2, 1990

[30] Foreign Application Priority Data

Jun. 30, 1989 [JP] Japan .................. 1-77854[U]

[51] Int. Cl.5 .................................... B62D 1/18
[52] U.S. Cl. ...................... 280/777; 74/493; 296/70
[58] Field of Search .............. 296/70, 74; 180/90; 280/775, 777; 74/493

[56] References Cited

U.S. PATENT DOCUMENTS

| | | | |
|---|---|---|---|
| 2,074,334 | 3/1937 | Hughes | 74/493 |
| 2,836,079 | 5/1958 | Salch | 74/493 |
| 3,011,823 | 12/1961 | Maher | 74/493 X |
| 3,058,367 | 10/1962 | Hoffmann | 74/493 |
| 3,262,332 | 7/1966 | Wight | 74/493 |
| 3,481,626 | 12/1969 | Fergle | 74/493 X |
| 3,600,003 | 8/1971 | Carey | 74/493 X |
| 3,837,422 | 9/1974 | Schlanger | 74/493 X |
| 3,855,876 | 12/1974 | Albrecht et al. | 180/90 X |
| 3,944,244 | 3/1976 | Albrecht | 74/493 X |
| 4,257,624 | 3/1981 | Hansen | 74/493 X |
| 4,448,276 | 5/1984 | Nakamoto et al. | 180/90 |
| 4,674,354 | 6/1987 | Brand | 280/777 X |
| 4,899,612 | 2/1990 | Bruhnke et al. | 280/775 |
| 4,943,107 | 7/1990 | Rhodes, Jr. | 296/70 |
| 4,946,192 | 8/1990 | Kuwahara | 280/777 X |
| 4,991,871 | 2/1991 | Sadakata | 280/777 |

FOREIGN PATENT DOCUMENTS

| | | | |
|---|---|---|---|
| 2581599 | 11/1986 | France | 296/70 |
| 57-26018 | 2/1982 | Japan . | |
| 218451 | 12/1983 | Japan | 296/70 |
| 2142712 | 1/1985 | United Kingdom | 74/493 |

Primary Examiner—Margaret A. Focarino
Assistant Examiner—Joseph D. Pape
Attorney, Agent, or Firm—Fleit, Jacobson, Cohn, Price, Holman & Stern

[57] ABSTRACT

An instrument panel of a vehicle mounts a cluster gauge and is formed with an opening through which a collapsible steering shaft projects. A steering end cover, formed as a hollow shell, is generally cylindrically shaped and covers an end portion of the collapsible steering shaft projecting above the instrument panel. A guide member, provided so as to overlap the opening, has a surface for guiding the hollow shell to sink or telescope into the opening when the collapsible steering shaft axially collapses during a front end, head-on collision.

10 Claims, 4 Drawing Sheets

INSTRUMENT PANEL STRUCTURE OF CAR BODY

The present invention relates to a structure of a dashboard or instrument panel of an automotive vehicle.

BACKGROUND OF THE INVENTION

1. Field of the Invention

In recently manufactured automotive vehicles, various safety measures have been taken in order to protect a driver of the vehicle during an accident. One known measure of this kind is to install a collapsible steering shaft, adapted and designed to axially collapse, so as to absorb or diminish an axial impact force applied to the driver's body from a steering wheel when the driver is thrown forwards from the driver's seat and collides with the steering wheel during a collision, in particular a front end, head-on collision.

Many vehicles have steering column covers attached to the top of the steering shaft so as to conceal the steering shaft between the steering wheel and an instrument panel or dashboard. Such a steering cover is usually located in front of the instrument panel and, therefore, overlaps with it. In an automotive vehicle, however, the collapsible steering shaft is not always effective to protect the driver against injury during a head-on collision. This is because although the steering shaft axially collapses and allows the steering shaft cover to displace when an axial force is applied to the steering wheel by the driver's body as it is thrown forwards from the driver's seat during the head-on collision, the steering shaft cover is obstructed by the instrument panel. Therefore, movement of the collapsible steering shaft is restricted, and an insufficient steering shaft collapse results.

2. Description of Related Art

To eliminate such a restriction of steering shaft collapse, it has been proposed to provide an instrument panel structured so as to be partly breakable by an impact applied by the column cover in order to allow the collapsible steering shaft to collapse sufficiently for driver protection. Such an instrument panel structure is known from Japanese Unexamined Patent Application No.55-101315, entitled "Concealing Panel Structure of Instrument Board," filed on July 25, 1980 and laid open as Japanese Unexamined Patent Publication No.57(1982)-26018 on Feb. 12, 1982.

The breakable part of the instrument panel has to be dimensioned so as to provide a sufficient area for the steering column cover to sink. This typically results in a jutted instrument panel configuration.

SUMMARY OF THE INVENTION

It is, therefore, the primary object of the present invention to provide an instrument panel structure for an automotive vehicle which is pleasing in appearance and which allows a sufficient axial collapse of a collapsible steering shaft during a collision so as to prevent injury to a driver.

The above and other objects are accomplished according to the present invention by a structure of an instrument panel comprising a steering end cover formed as a hollow shell generally cylindrically shaped so as to cover an end portion of a collapsible steering shaft projecting above the instrument panel, mounting a cluster gauge. Guide means are provided and have a surface for guiding the hollow shell so as to sink into an opening. The guide means are formed in the instrument panel and receive the collapsible steering shaft, when the collapsible steering shaft axially collapses during a collision, in particular a front end, head-on collision.

The instrument panel is further provided with a visor bank provided thereon to surround the cluster gauge and formed with an open space overlapping the opening thereof. The visor bank is integrally formed or provided with a cross beam to form an open space for disposing therein the guide means and allowing the hollow shell to sink during an axial collapse of the collapsible steering shaft. The cross beam is desirably integrally formed with the guide means.

BRIEF DESCRIPTION OF THE DRAWINGS

The above and other objects and features of the invention will be apparent from the following description of a specific embodiment when considered in conjunction with the appended drawings, in which.

DESCRIPTION OF THE PREFERRED EMBODIMENT

Figure 1:
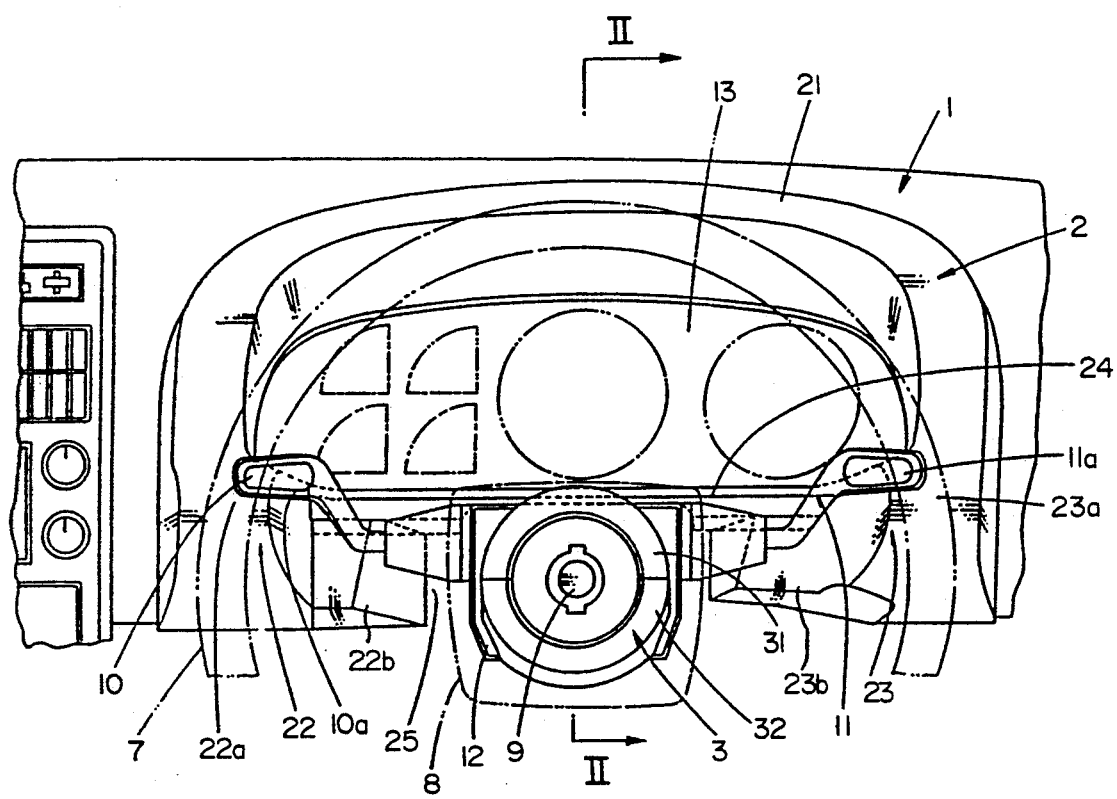
FIG. 1 is a front view showing an instrument panel in accordance with a preferred embodiment of the present invention.
Figure 2:
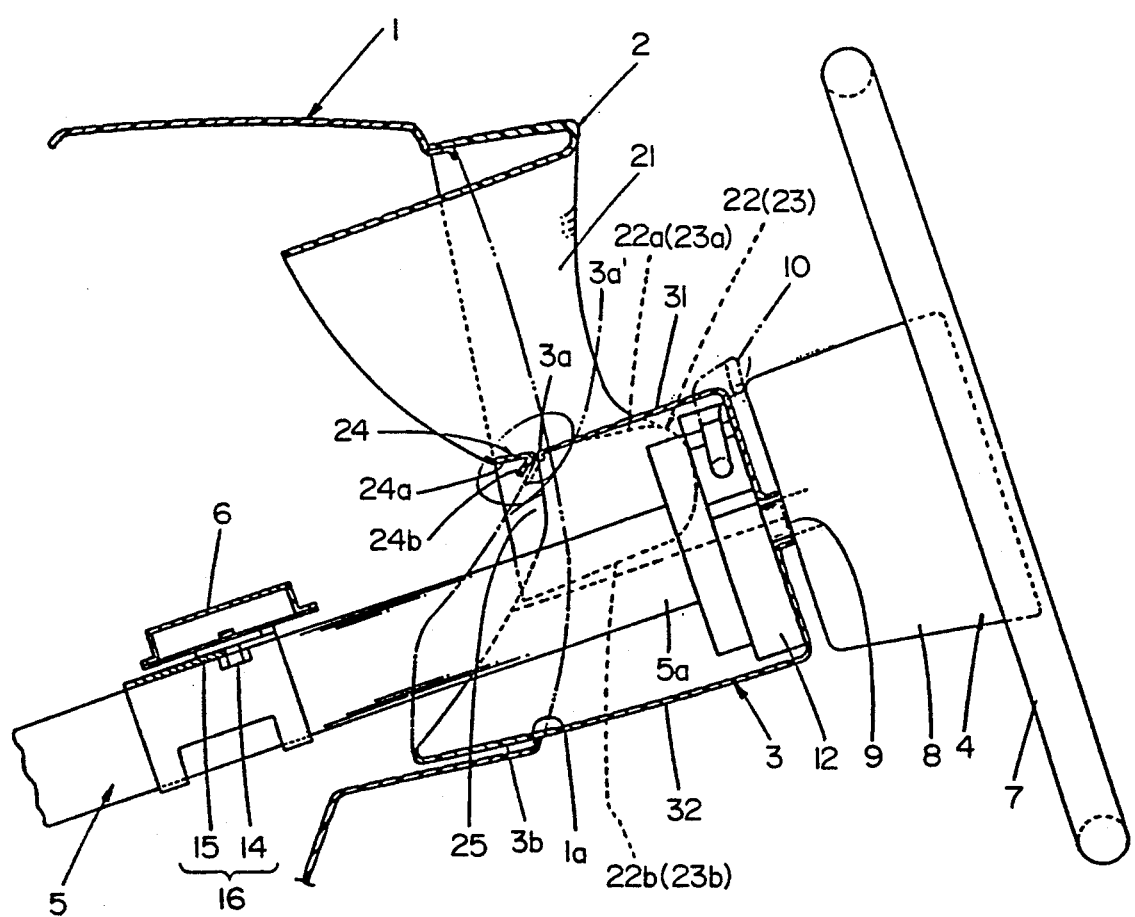
FIG. 2 is a cross-sectional view of FIG. 1, as seen along line II—II.
Figure 3:
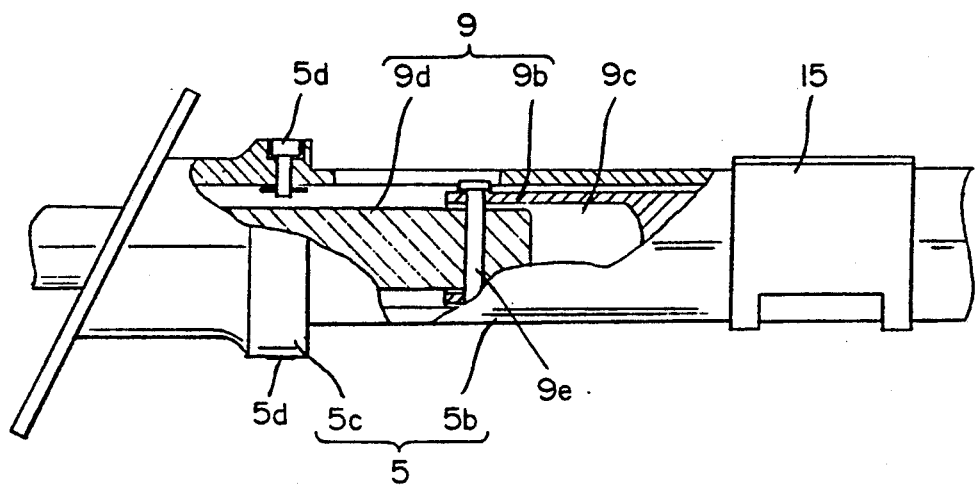
FIG. 3 is a side view, partly in cross-section, showing part of a collapsible steering column.

Referring to the drawings in detail, in particular to FIGS. 1 to 3, a driver compartment or cockpit of a vehicle having an instrument panel structure in accordance with a preferred embodiment of the present invention is partly shown. An instrument panel 1 is provided with a cluster gauge 13. In order to allow the driver to see the cluster gauge 13 distinctly, a visor bank 2, surrounding the cluster gauge 13 and having a generally U-shaped cross-section, is provided. The visor bank 2 projects toward eyes of the driver on a driver's seat (not shown). The instrument panel 1 further has or is formed with an opening 1a in its lower part close to the cluster gauge 13. This opening 1a is configured to conform or be similar to a contour of a steering column cover 3 which will be described in detail later.

The visor bank 2 comprises a plateau wall section 21 surrounding the upper side and opposite ends of a specific rectangular area within which the cluster gauge 13 exists, and end wall extension sections 22 and 23. Each end wall extension section 22 or 23, integrally formed with the plateau wall section 21, has an upper surface 22a or 23a tapered or curved from the top surface of the plateau wall section 21 to the surface of the instrument panel 1 and a laterally extending, stepped side terrace 22b or 23b projecting inwardly. It should be noted that the curved upper surfaces 22a and 23a of the end wall extension sections 22 and 23 are designed to provide smooth guide surfaces for combination switch levers 10 and 11, such as a control lever for lights and turn signals and for a windshield wiper and washer control lever, respectively. The visor bank 2 is provided with a cross beam 24 connected to upper side surfaces of the side terraces 22b and 23b of the end wall extension sections 22 and 23 so as to form an open space 25, overlapping the opening 1a formed in the instrument panel 1, between the cross beam 24 and side terraces 22b and 23b.

As is shown in detail in FIG. 2, the cross beam 24 comprises a substantially horizontal beam section 24a and a flange or flap section 24b formed, as a turnback, integrally with the beam section 24a at an angle smaller than 45 degrees with respect to the beam section 24a. It is also to be noted that the flap section 24b of the cross beam 24 is configured to have a surface to conform or be similar to a contour of an upper half section of the steering column cover 3 so as to serve as a guide surface for the steering column cover 3 attached to the top of a telescopic, collapsible steering column 5 when the steering column cover 3 moves or sinks into the opening 1a during a collapse of the collapsible steering column 5.

The open space 25 receives therein the collapsible steering column 5 enclosing a collapsible steering shaft 9. As is shown in FIG. 3, the collapsible steering shaft 9 comprises an upper shaft section 9b with a bore 9c and a lower shaft section 9d with its top end portion slidably received in the bore 9c. The upper and lower shaft sections 9b and 9d are coaxially aligned and interconnected by a shear pin 9e so as to be locked together disabled from having a relative sliding movement produced therebetween. However, the shear pin 9e is adapted to be sheared when the steering shaft has applied to it an axial force larger than a predetermined specific value, so as to allow the upper and lower shaft sections 9b and 9d to undergo a relative sliding movement in which the steering shaft 9 axially collapses when the steering wheel has the specific axial force applied thereto during a head-on collision. Similarly, the collapsible steering column 5, rotatably receiving therein the collapsible steering shaft 9, comprises a cylindrical upper column section 5b and a cylindrical slidably receiving therein the cylindrical upper column section 5b. The cylindrical lower column section 5c is secured to the car body. The upper and lower column sections 5b and 5c are interconnected by shear pins 5d so as to be locked together and disabled from having a relative sliding movement produced therebetween. The shear pins 5d are also adapted to be sheared when the steering column 5 is applied with the specific axial force, so as to allow the upper column section 5b to slide in the lower column 5c, i.e., to allow the steering column 5 to axially collapse at the same time the steering shaft 9 axially collapses. The collapsible steering column and shaft 5 and 9 may be any type of collapsible structure well known in the art.

The collapsible steering shaft 9, and hence, the collapsible steering column 5, extends and inclines upwardly toward the driver's seat. To support the inclined collapsible steering column 5, supporting means 16 is provided and comprises a stationary support bracket 6 with a guide pin 14 and a column support bracket 15 with an open ended slot receiving the pin 14. The column support bracket 15 is secured to the collapsible steering column 5. The open ended slot, usually holding the pin 14 to support the collapsible steering column 5, allows the pin 14 to slide therein only when the collapsible steering column 5 axially collapses.

The collapsible steering column 5 is fixedly provided, at its upper end section 5a projecting above the instrument panel 1, with a click spring 12 for clicking the left and right combination switch levers 10 and 11 extending laterally on opposite sides of the steering column 5. The collapsible steering shaft 9 is attached, at the top end thereof, to the steering column cover 3 for supporting a steering wheel unit 4. This steering wheel unit 4 comprises a steering wheel 7 and an air bag container 8 in which an air bag, when empty, is contained.

Because the upper end section 5a of the collapsible steering column 5 is located in the open space 25 formed between the end wall sections 22 and 23 of the visor bank 2 which have the curved upper surfaces 22a and 23a, the combination switch levers 10 and 11 would interfere with the end wall sections 22 and 23 of the visor bank 2 if they were to extend laterally straight. To eliminate such interference, each combination switch lever 10 or 11 is shaped in the form of a crank so as to provide a clearance between the grip end 10a or 11a of each combination switch lever 10 or 11 and each upper surface 22a or 23a of the end wall section 22 or 23 of the visor bank 2.

Figure 4:
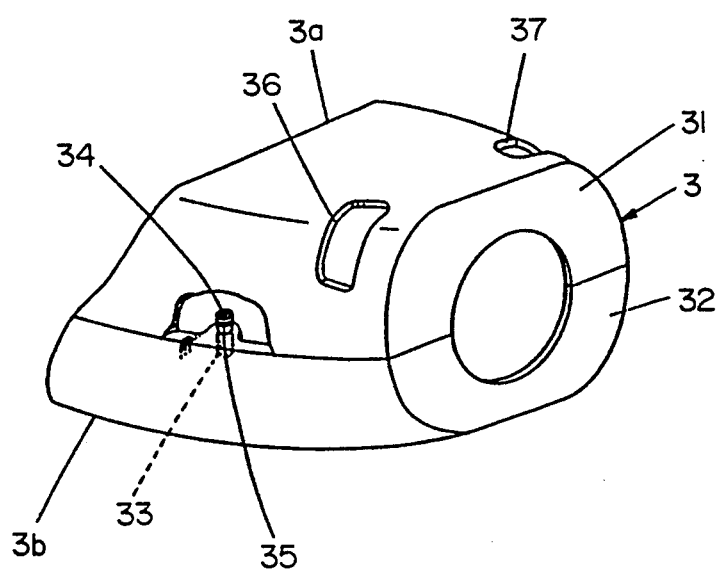
FIG. 4 is a perspective view, partly in cross-section, showing a steering column cover.

Referring to FIG. 4, the steering column cover 3, preferably made of a plastic material and configured to have a substantially elliptical or cylindrical hollow column having flat upper and lower surfaces, comprises upper and lower halves of shells 31 and 32. The steering column cover 3 has an upper rear or bottom edge 3a conforming to the front edge of the cross beam 24 to provide a trim line and a lower rear or bottom edge 3b extending inside the instrument panel when installed in the opening 1a. These upper and lower halves of shells 31 and 32 are assembled to the column cover 3 as one unit by firmly fitting studs or pins 34, fixed to a fitting surface of the upper half of shell 31 at several points, into corresponding bores 33 formed in a fitting surface of the lower half of shell 32. Each pin 34 is formed with an annular peripheral groove 35 which is located in the contact surface between the fitting surfaces of the upper and lower halves of shells 31 and 32. The pin 34 allows itself to shear along the annular groove 35 when the column cover 3 has applied thereto a certain amount of axial force which is not balanced between the upper and lower halves of shells 31 and 32. The column cover 3 is fixed to the upper end section 5a of the steering column 5 projecting outside the instrument panel 1 so as to cover the upper end section 5a of the steering column 5, the click spring 12 and associated elements all together. Designated by reference numerals 36 and 37 are openings formed in the upper half of shell 31 which receive and allow the combination switch levers 10 and 11, respectively, to turn upward and downward.

If the vehicle collides, for instance, head on, the vehicle stops dead and the driver's body is thrown forwards, in a sitting posture. When a collision is detected, the air bag system is actuated to inflate the air bag 17 in the air bag container 8 of the steering wheel unit 4. If an impact caused by a straight on, front-end collision is mild or not so great, the air bag 17 is momentarily compressed and converts some of the kinetic energy applied by the driver's body to potential elastic energy, thereby holding the driver's body, so as to safely protect the driver against injury.

Figure 5:
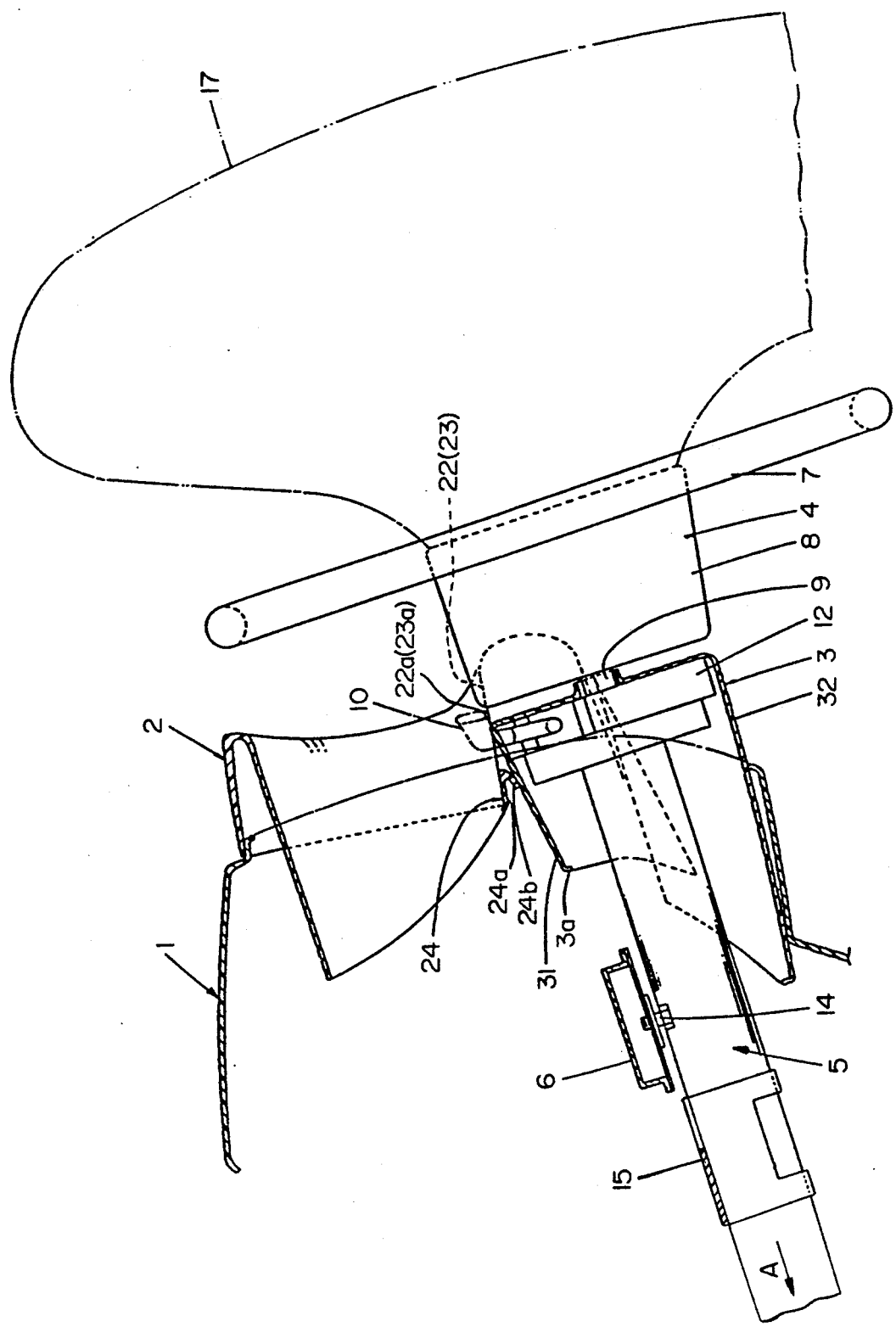
FIG. 5 is a cross-sectional view, similar to FIG. 2, wherein the steering column lever is shown as sinking.

When the driver's body is thrown forwards at a high speed and crashes against the inflated air bag 17 with an impact sufficiently greater than the specific axial force, the connecting pins 5d and 9e are sheared so as cause both the steering shaft and column 9 and 5 to axially collapse, as is shown in FIG. 5. As the axial collapse of the steering shaft and column 9 and 5 occurs, the steering column cover 5 is forced to move. Cover 5 crashes and moves relative to the steering panel 1 to sink or telescope into the opening 1a. During the crash, the steering column cover 3 easily and smoothly telescopes, relative to opening 1a, with the rear or bottom edge 3a of the upper half of shell 31, having been previously conformed to the front edge of the cross beam 24, guided by the flange or flap section 24b formed integrally with the beam section 24a and inclined downwards at an angle with respect to the beam section 24a. Furthermore, the upper half of shell 31 is applied with a reaction force which is greater than the reaction force applied to the lower half of shell 32, so as to shear the pins 34 connecting the upper and lower halves of shells 31 and 32 so as to separate them. The guided sinking and separation of the steering column cover 3 allows the steering column 5 to easily and sufficiently collapse with reliability.

The steering column cover 3 and combination switch levers 10 and 11 are arranged and located above the visor bank 2 surrounding the cluster gauge 13. The steering column 5 thus can easily collapse by the aid of guiding the steering column cover 3 past the flap section 24b formed integrally with the beam section 24a of the cross beam 24 and the combination switch levers 10 and 11 by the end wall extension sections 22 and 23 of the visor bank 2 when the inflated air bag 17 is subjected to a great deal of impact during a straight on, front-end collision. Reaction impact against the driver's body is therefore greatly reduced, so as to protect the driver against injury with greatly improved reliability.

The column cover 3 may, if desired, be provided with or integrally formed with a guide flap or flange 3a' along the upper rear edge 3a of the upper half of shell 31, as is shown by dotted lines in FIG. 2. Such a guide flange 3a' provides a smoother movement of the column cover 3 itself into the opening 1a of the instrument panel 1, and thereby allows the steering column 5 to collapse more easily.

It is to be understood that the present invention has been described in detail with respect to a preferred embodiment. Nevertheless, various other embodiments and variants are possible which are within the spirit and scope of the invention, and such embodiments and variants are intended to be covered by the following claims.

What is claimed is:

1. An instrument panel structure of an automotive vehicle, having a collapsible steering shaft extending towards a driver seat of the automotive vehicle and an instrument panel including an opening formed therein, said instrument panel having mounted thereon a cluster gauge and a visor bank surrounding said cluster gauge, and being disposed in front of said driver seat, said opening formed in said instrument panel and receiving said collapsible steering shaft, said instrument panel structure comprising:

a cover having a hollow shell which is generally cylindrically shaped so as to cover an end portion of said collapsible steering shaft projecting above said instrument panel; and guide means provided between said visor bank and an end of said cover for guiding movement of said hollow shell during a collision, the guide means having an inwardly bent flap section forming a surface for engaging said end of said cover and sliding over said hollow shell as it sinks into said opening when said collapsible steering shaft axially collapses during said collision.

2. An instrument panel structure as defined in claim 1, wherein said guide means is provided on said instrument panel.

3. An instrument panel structure as defined in claim 1, wherein further guide means is integrally provided on said cover.

4. An instrument panel structure of an automotive vehicle, having a collapsible steering shaft extending towards a driver seat of the automotive vehicle and an instrument panel including an opening formed therein, said instrument panel having mounted thereon a cluster gauge and being disposed in front of said seat, said opening formed in said instrument panel receiving said collapsible steering shaft, said instrument panel structure comprising:

a cover having a hollow shell which is generally cylindrically shaped so as to cover an end portion of said collapsible steering shaft projecting above said instrument panel;

a visor bank provided on said instrument panel to surround said cluster gauge and formed with an open space overlapping said opening; and guide means disposed in said open space and provided between said visor bank and an end of said cover for guiding movement of said hollow shell during a collision, the guide means having an inwardly bent flap section forming a surface for engaging said end of said cover and sliding over said hollow shell as it sinks into said opening when said collapsible steering shaft axially collapses during said collision.

5. An instrument panel structure as defined in claim 4, wherein said guide means is formed as a part of said visor bank.

6. An instrument panel structure of an automotive vehicle, having a collapsible steering shaft extending towards a driver seat of the automotive vehicle and an instrument panel including an opening formed therein, said instrument panel having mounted thereon a cluster gauge and being disposed in front of said seat, said opening formed in said instrument panel and receiving said collapsible steering shaft, said instrument panel structure comprising:

a cover having a hollow shell which is generally cylindrically shaped so as to cover an end portion of said collapsible steering shaft projecting above said instrument panel;

a visor bank provided on said instrument panel to surround said cluster gauge and formed with an open space overlapping said opening, said visor bank comprising a plateau wall section surrounding an upper side and opposite ends of an area within which said cluster gauge exists and a lower cross beam; and guide means at least partly formed by said lower cross beam, said guide means disposed in said open space and having a surface for guiding said hollow shell to sink into said opening when said collapsible steering shaft axially collapses during a collision.

7. An instrument panel structure as defined in claim 6, wherein said visor bank further comprises wall extension sections disposed on opposite sides of said area so as to provide said open space therebetween in combination with said lower cross beam, each said wall extension section having a surface curved from a top surface of said plateau wall section to said instrument panel for guiding a combination switch lever, which extends from said cover and is able to turn about an axis of rotation of said steering shaft, when said cover sinks into said opening during a collision.

8. An instrument panel structure as defined in claim 6, wherein said generally cylindrically shaped hollow shell comprises upper and lower halves of shells separately formed and connected to each other by a plurality of fitting pins.

9. An instrument panel structure as defined in claim 8, wherein said upper and lower halves of shells are made of plastic material.

10. An instrument panel structure as defined in claim 8, wherein said fitting pin is formed with an annular groove so as to allow itself to be sheared so as to separate said generally cylindrically shaped hollow shell into said upper and lower halves of shells when said cover sinks into said opening.

* * * * *